United States Patent
Hiraishi et al.

(10) Patent No.: US 7,344,438 B2
(45) Date of Patent: Mar. 18, 2008

(54) AIR CONDITIONER FOR VEHICLE

(75) Inventors: Kenichi Hiraishi, Aichi (JP); Shinichi Yamamuro, Aichi (JP); Naoya Satake, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 95 days.

(21) Appl. No.: 10/836,257

(22) Filed: May 3, 2004

(65) Prior Publication Data
US 2005/0000680 A1 Jan. 6, 2005

(30) Foreign Application Priority Data
May 13, 2003 (JP) .............................. 2003-134377

(51) Int. Cl.
*B60H 1/34* (2006.01)

(52) U.S. Cl. ...................................... 454/153; 454/906

(58) Field of Classification Search ................ 454/153, 454/285, 906
See application file for complete search history.

(56) References Cited

U.S. PATENT DOCUMENTS

| | | | | |
|---|---|---|---|---|
| 3,540,547 A | * | 11/1970 | Coward, Jr. ................. | 181/225 |
| 3,918,541 A | * | 11/1975 | Krieger .................... | 180/69.22 |
| 5,383,815 A | * | 1/1995 | Kiesel et al. ................ | 454/137 |
| 5,557,078 A | * | 9/1996 | Holwerda .................... | 181/208 |
| 5,567,922 A | * | 10/1996 | Schmuck et al. ........... | 181/284 |
| 5,741,390 A | * | 4/1998 | Schmuck et al. ........... | 156/280 |
| 5,836,813 A | * | 11/1998 | Miyata et al. .............. | 454/139 |
| 6,550,571 B1 | * | 4/2003 | Kimura et al. .............. | 181/200 |
| 6,607,432 B2 | * | 8/2003 | Schaake ..................... | 454/143 |
| 6,719,078 B2 | * | 4/2004 | Nakamura ................ | 180/69.22 |

FOREIGN PATENT DOCUMENTS

| | | |
|---|---|---|
| DE | 19960851 A1 | 6/2000 |
| JP | 7-101223 A | 4/1995 |
| JP | 8-15844 B2 | 2/1996 |
| JP | 10-250343 A | 9/1998 |
| JP | 2000-127740 A | 5/2000 |

\* cited by examiner

*Primary Examiner*—Derek S. Boles
(74) *Attorney, Agent, or Firm*—Birch, Stewart, Kolasch & Birch, LLP (57) ABSTRACT

There is provided an air conditioner for a vehicle, including an air intake provided on a vehicle compartment inner side of a quarter inner panel and on the side of the quarter inner panel, a fan provided on the side of the air intake port and performs forced ventilation, and a cover provided in front of the air intake port and causes operation noise of the fan emitted from the air intake port to interfere with each other so that the noise can be reduced. With this arrangement, operating noise of the fan emitted from the air intake can be reflected in a direction away from a passenger seated on a seat in a vehicle compartment.

11 Claims, 9 Drawing Sheets

AIR CONDITIONER FOR VEHICLE

CROSS-REFERENCE TO RELATED APPLICATION

This application incorporates by references the subject matter of Application No. 2003-134377 filed in Japan on May 13, 2003, on which a priority claim is based on 35 U.S.C. § 119(a).

BACKGROUND OF THE INVENTION (1) Field of the Invention

The present invention relates to an air conditioner for a vehicle.

(2) Description of the Related Art

An air conditioner for a vehicle, which controls the temperature in the interior of a vehicle compartment, is installed in e.g., an engine room located at the front of the vehicle, and a blow-off port of the air conditioner is provided at the front of the vehicle compartment. The cooled air is blown from the blow-off port into the vehicle compartment so that the temperature in the interior of the vehicle compartment as a whole can be controlled. In the case of a vehicle which has a large space in the vehicle compartment, however, even if the air conditioner as stated above is used to control the temperature at front of the vehicle compartment to an optimum temperature, there is a possibility that the temperature at rear of the vehicle compartment cannot be controlled to the optimum temperature. To address this problem, there has been proposed a technology in which a blow-off port of a vehicle air conditioner for a vehicle is provided at the rear of a vehicle compartment, and a vehicle air conditioner (rear air conditioner) is provided at the rear of the vehicle compartment.

The rear air conditioner is disposed between a trim (interior part) and a vehicle body panel (body) at the rear of a vehicle. Since a fan is disposed at the side of an air intake port of the rear air conditioner, operating noise of the fan is emitted from the air intake port to the outer side of the rear air conditioner. Therefore, to prevent the operating noise from being directly transmitted into the vehicle compartment, the air intake port is disposed in opposed relation to the vehicle body panel.

Also, a technology in which a noise caused by an air conditioner provided at the rear of a vehicle has been proposed in Japanese Examined Patent Publication No. 8-15844. According to this technology, a plurality of holes are formed in an upper surface of a ceiling case in a vehicle compartment, which comprises a material capable of absorbing noise, and at least on the upper side of a heat exchanger, so that in a range where the holes are formed on the upper surface of the case, noise is passed through the case without being reflected on an inner surface of the case, and is absorbed by a ceiling material as a noise absorbing material, so that noise can be reduced.

The conventional rear air conditioner is provided in close proximity to a flat cover, and the air intake port is disposed in opposed relation to the flat cover. For this reason, there is a possibility that operating noise of the fan emitted from the air intake port is reflected on the flat cover, and leaks into the vehicle compartment through the trim.

Also, the vehicle air conditioner disclosed in Japanese Examined Patent Publication No. 8-15844 as described above has the problem that noise is reduced in dependence on the noise absorbing effect of a noise absorbing material, and hence noise may not be satisfactorily reduced depending on a noise absorbing material that is used, and an expensive absorbing material has to be used in order to achieve a satisfactory noise reducing effect.

SUMMARY OF THE INVENTION

The present invention provides an air conditioner for a vehicle, which includes a vehicle body panel; an air-conditioning device provided on an inner side of a vehicle compartment and in vicinity of the vehicle body panel, and comprising an air intake port on side of the vehicle body panel; and noise reducing device provided at a location opposed to the air intake of the vehicle body panel, for causing noise emitted from the air intake port to interfere with each other and reducing the noise.

The present invention also provides an air conditioner for a vehicle, which includes a vehicle body panel; an air-conditioning device provided on an inner side of a vehicle compartment and in the vicinity of the vehicle body panel, and comprising an air intake port on side of the vehicle body panel; a seat provided at a location opposed to the air conditioning device and on an inner side of the vehicle compartment as compared with the air conditioning device; and noise direction changing device provided at a location opposed to the air intake port of the vehicle body panel, for changing a direction of noise emitted from the air intake to such a direction away from a head of a passenger seated on the seat.

BRIEF DESCRIPTION OF THE DRAWINGS

The nature of this invention, as well as other objects and advantages thereof, will be explained in the following with reference to the accompanying drawings, in which like reference character designate the same or similar parts throughout figure and wherein.

DETAILED DESCRIPTION OF THE PREFERRED EMBODIMENTS

The present invention will now be described in detail with reference to the accompanying drawings showing preferred embodiments thereof.

Figure 2:
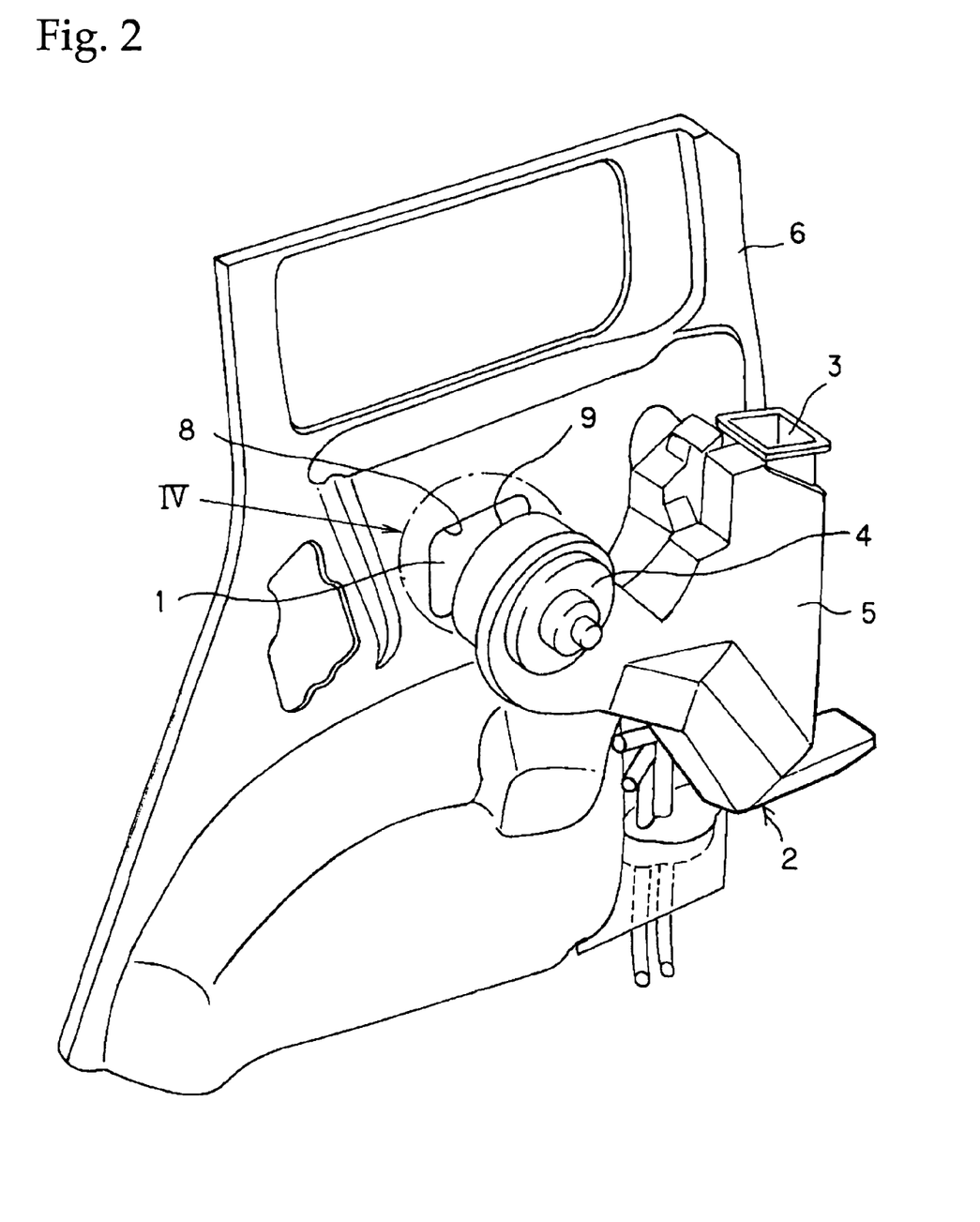
FIG. 2 is a perspective view showing the state in which the air conditioner for the vehicle according to the first embodiment is mounted on a vehicle body panel.

As shown in FIG. 2, a rear air conditioner 2 comprises an air intake port 9 through which air is taken into a rear air conditioner case 5, and a blow-off port 3 through which the air is blown from the rear air conditioner case 5 into a vehicle compartment. A fan 4 with a blower motor incorporated therein is provided on the side of the air intake port 9. If the fan 4 is operated to perform forced ventilation, the air is blown from the air intake port 9 into the vehicle compartment via the blow-off port 3. It should be noted that the fan 4 is formed such that the rotational axis thereof, i.e., the rotational center thereof is protruded most to the outer side of the vehicle compartment, and is closest to the air intake port 9. Further, in the rear air conditioner housing 5, an evaporator, not shown, performs heat exchange to cool the air. Namely, the cooled air is blown from the blow-off port 3 into the vehicle compartment.

Figure 3:
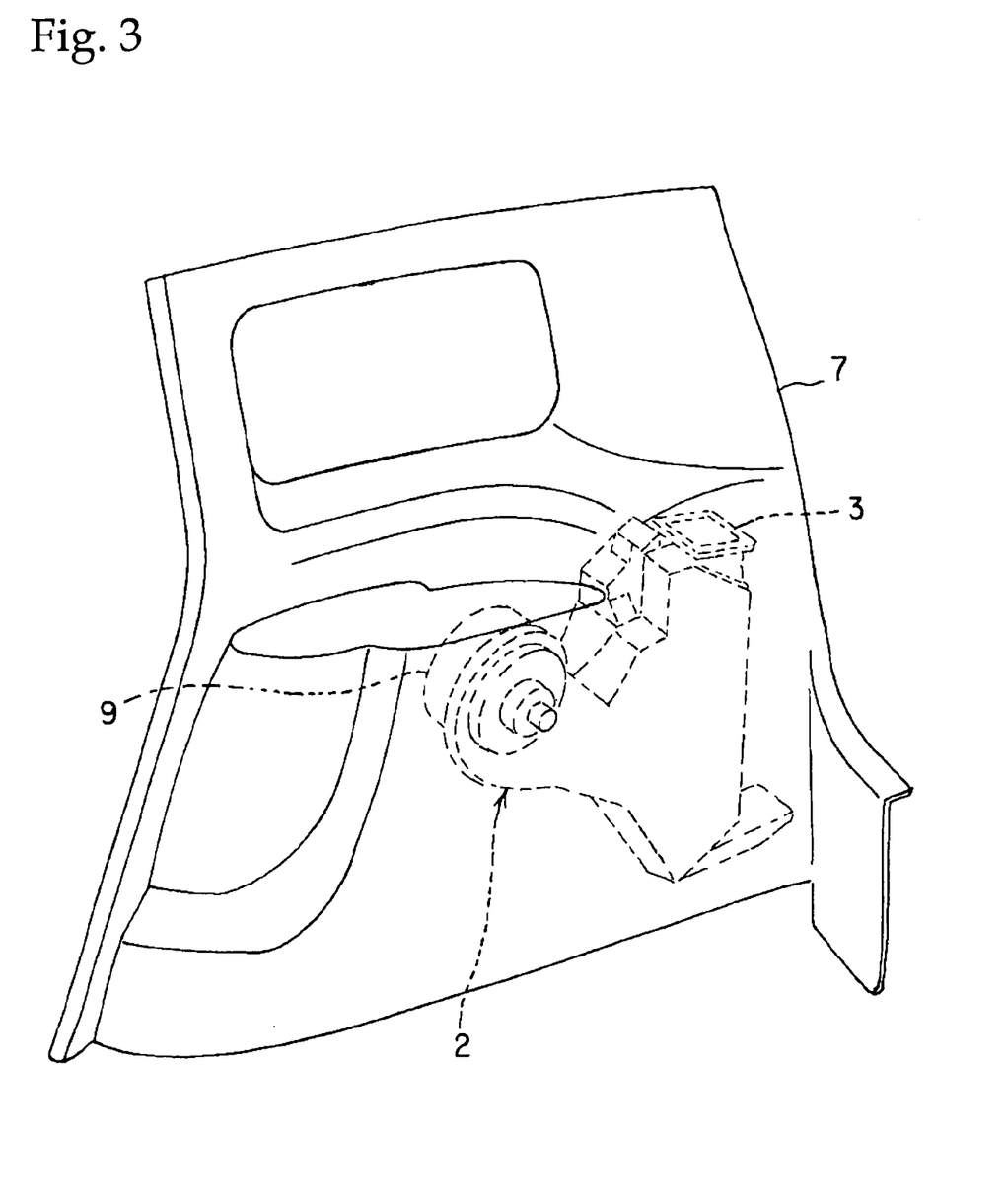
FIG. 3 is a perspective view showing the state in which the air conditioner for the vehicle according to the first embodiment is mounted on a trim.

As shown in FIG. 3, the rear air conditioner 2 is disposed between a quarter inner panel 6 (refer to FIG. 2) of a vehicle and a quarter trim 7 as an interior part. As shown in FIG. 2, the air intake port 9 is formed in opposed relation to the quarter inner panel 6, so that operating noise from the rear air conditioner 2 is not emitted into the vehicle compartment. A hole 8 for inserting a welding robot arm therethrough, which is formed in the quarter inner panel 6, is located in front of the air intake port 9. A cover 1, as a noise reducing device, is fitted in the hole 8 to prevent noise from being transmitted from an outside to the interior of the vehicle compartment, and to prevent e.g., operating noise of the fan 4, which is emitted from the air intake port 9, from being emitted toward the passenger in the vehicle compartment.

Figure 1:
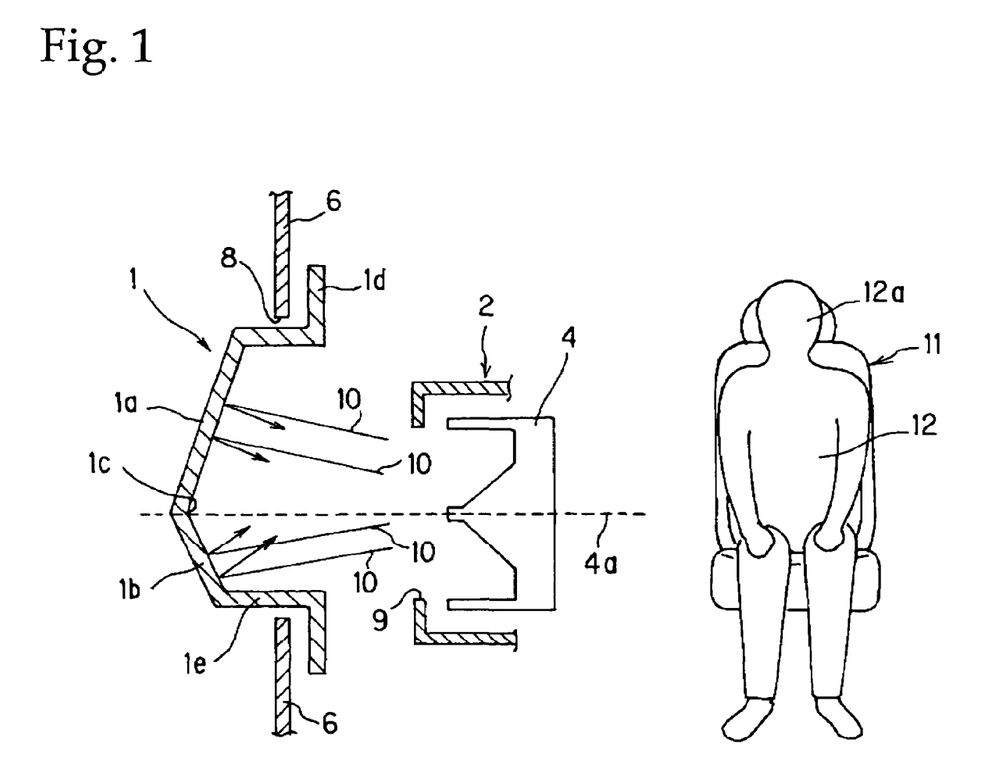
FIG. 1 is a partial longitudinal sectional view showing an air conditioner for a vehicle according to a first embodiment of the present invention.
Figure 4:
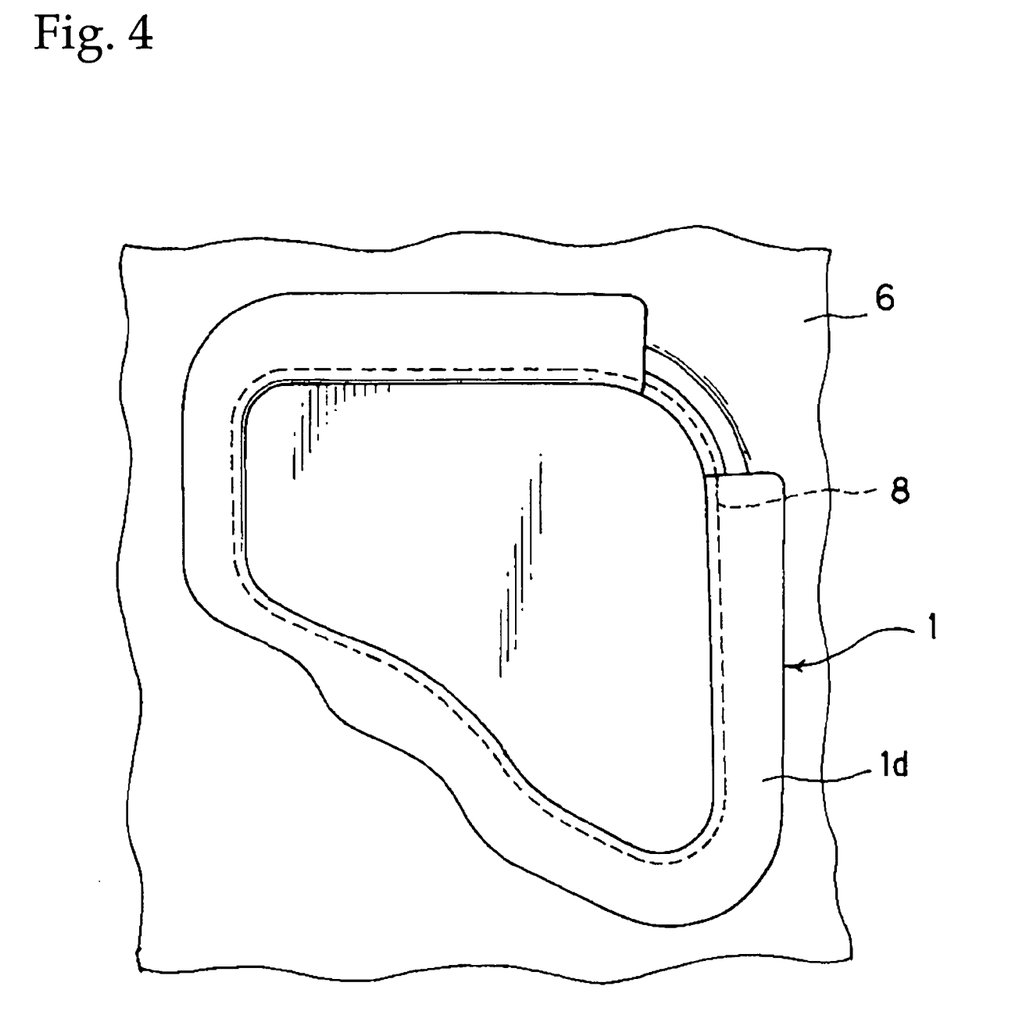
FIG. 4 is a side view showing the air conditioner for the vehicle according to the first embodiment is mounted on the vehicle body panel.
Figure 5:
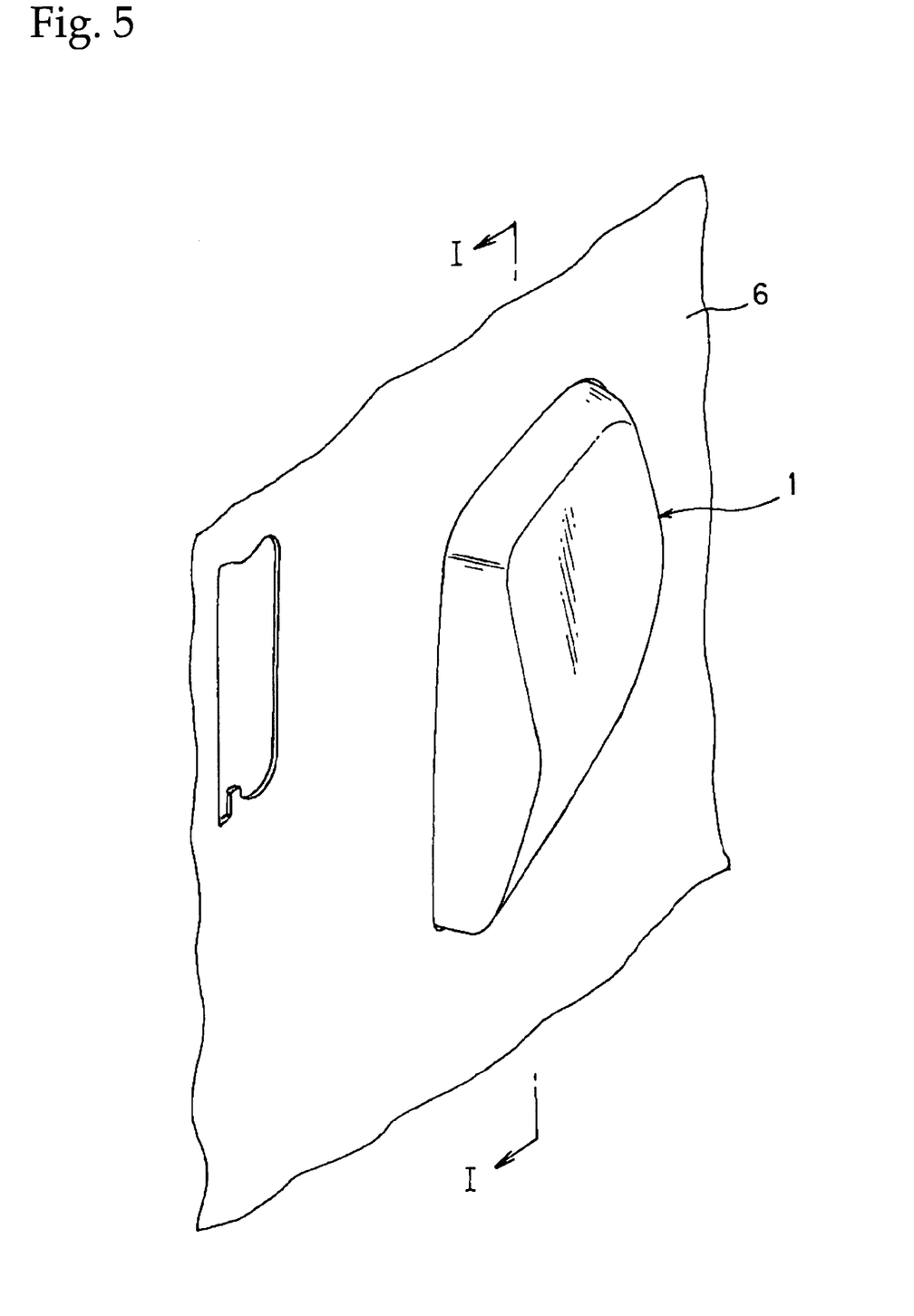
FIG. 5 is a perspective view showing the state in which a cover according to the first embodiment is mounted on the vehicle body panel.

As shown in FIG. 1, the cover 1 comprises a first inclined surface 1a which extends toward the outer side of the vehicle and in the direction of the height of the vehicle, a second inclined surface 1b joined to the lower end of the first inclined surface 1a and extending toward the inner side of the vehicle and in the direction of the height of the vehicle and, and flat surfaces 1e which are respectively joined to the upper end of the first inclined surface 1a and the lower end of the second inclined surface 1b and horizontally extending toward the inner side of the vehicle, and a flange 1d joined to the right ends of the flat surfaces 1e and extending in the direction of the height of the vehicle. As shown in FIG. 4, the flange 1d is superposed on the quarter inner panel 6. Further, as shown in FIGS. 1 and 5, the cover 1 is concaved on the outer side of the vehicle. A location where the first inclined surface 1a and the second inclined surface 1b are joined to each other corresponds to a deepest part 1c which is concaved most on the outer side of the vehicle. It should be noted that if the cover 1 is fitted into the hole 8, the deepest part 1c is positioned in substantially opposed relation to a rotational center 4a of the fan 4.

Operating noise 10 emitted from the air intake port 9 of the rear air conditioner 2 is reflected on the first inclined surface 1a and the second inclined surface 1b of the cover 1. The noise reflected on the first inclined surface 1a is emitted from the air intake 9 in a downward direction of the vehicle, i.e., in a direction away from a head 12a of a passenger 12 seated on a seat 11 in the vehicle compartment. On the other hand, the noise reflected on the second inclined surface 1b is emitted in an upward direction of the vehicle. As a result, the noise reflected on the first inclined surface 1a and the noise reflected on the second inclined surface 1b interfere with each other and cancel each other, so that the noise emitted into the vehicle compartment can be reduced.

Further, noise emitted from the rear air conditioner 2 is gradually diffused from the rotational axis of the fan 4 as it becomes closer to the outer side of the vehicle. Therefore, if the deepest part 1c of the cover 1 is substantially an extension of the rotary axis of the fan 4, noise reflected on the first inclined surface 1a and noise reflected on the second inclined surface 1b interfere with each other and cancel each other in the most effective manner. As a result, the operating noise 10 emitted from the air intake port 9 of the rear air conditioner 2 can be efficiently reduced.

It should be noted that the deepest part 1c of the cover 1 does not necessarily have to be an extension of the rotational axis of the fan 4, but may be located at any other position insofar as the first inclined surface 1a is disposed at such a position as to reflect noise emitted from the air intake port 9 in a downward direction of the vehicle, and the second inclined surface 1b is disposed at such a position as to reflect the operating noise 10 emitted from the air intake port 9 in an upward direction of the vehicle so that the noise interfere with each other.

Further, although in the present embodiment, the cover 1 which has the above sectional form is mounted in the direction of the height of the vehicle, the direction in which the cover 1 is mounted is not limited, but it is possible to adopt e.g., a cover which has a similar sectional form in the direction of the length of the vehicle, and a cover which has a similar sectional form diagonally in the direction of the height of the vehicle. That is, even if the cover 1 is mounted in any arbitrary direction, the same effects as in the present embodiment can be obtained insofar as it is configured such that operating noise emitted from the air intake port 9 toward the outer side of the vehicle interfere with each other and is reduced as a result.

Figure 6:
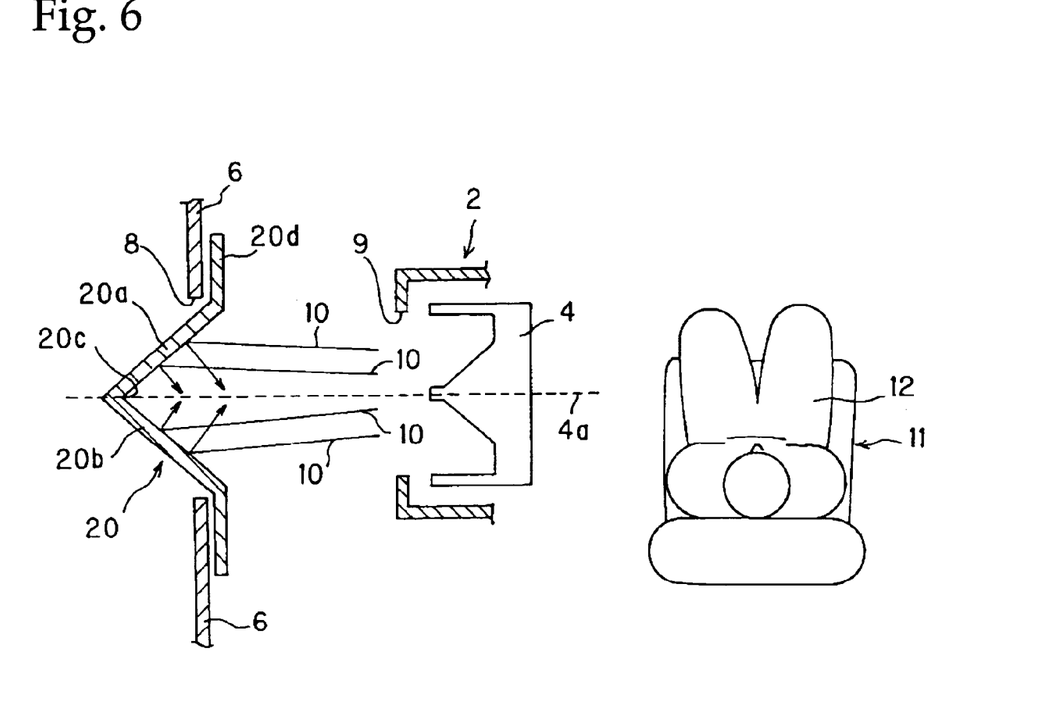
FIG. 6 is a partial sectional view of an air conditioner for a vehicle according to a second embodiment of the present invention as viewed in a horizontal direction.

FIG. 6 is a partial sectional view showing an air conditioner for a vehicle as viewed in a horizontal direction according to a second embodiment of the present invention. As shown in FIG. 6, a cover 20 is a variation of the cover 1, as the noise reducing device, in the first embodiment. As is the case with the cover 1 used in the first embodiment, the cover 20 is concaved on the outer side of the vehicle. The cover 20 comprises a first inclined surface 20a extending toward the outer side of the vehicle as it extends rearward in the vehicle, a second inclined surface 20b joined to the rear end of the first inclined surface 20a and extending toward the inner side of the vehicle as it extends rearward in the vehicle, and a flange 20d joined to the upper end of the first inclined surface 20a and the lower end of the second inclined surface 20b and extending in the direction of the length of the vehicle. A location where the first inclined surface 20a and the second inclined surface 20 are joined to each other corresponds to a deepest part 20c concaved most on the outer side of the vehicle. It should be noted that if the cover 20 is fitted into the hole 8, the deepest part 20c is positioned to be an extension of the rotational center 4a of the fan 4.

The operating noise 10 emitted from the air intake 9 port of the rear air conditioner 2 is reflected on the first inclined surface 20a and the second inclined surface 20b of the cover 20. The noise reflected on the first inclined surface 20a is emitted from the air intake 9 in a rearward direction of the vehicle, i.e., in a direction away from the passenger 12 in the vehicle compartment. Also, the noise reflected on the second inclined surface 20b is emitted from the air intake 9 in a forward direction of the vehicle, i.e., in a direction away from the passenger 12 in the vehicle compartment. As a result, the noise reflected on the first inclined surface 20a and the noise reflected on the second inclined surface 20b interfere with each other and cancel each other, so that the noise from the rear air conditioner 2 can be reduced.

Since the deepest part 20c of the cover 20 is located to be substantially an extension of the rotational shaft of the fan 4, operating noise emitted from the rear air conditioner 2 can be reduced in the most efficient manner.

Further, although in the present embodiment, the cover 1 which has the above described sectional form is mounted in the direction of the height of the vehicle, the direction in which the cover 20 is mounted is not limited, but it is possible to adopt e.g., a cover which has a similar sectional form in the direction of the length of the vehicle, and a cover which has a similar sectional form diagonally in the direction of the height of the vehicle. Also, it is possible to adopt a cover which has a similar form in the direction of the height of the vehicle and in the direction of the length of the vehicle, i.e., a cover which has a geometric emission surface. Even if such covers are adopted, noise reflected on the cover interfere with each other to be reduced as is the case with the cover 20 adopted in the present embodiment.

Figure 7:
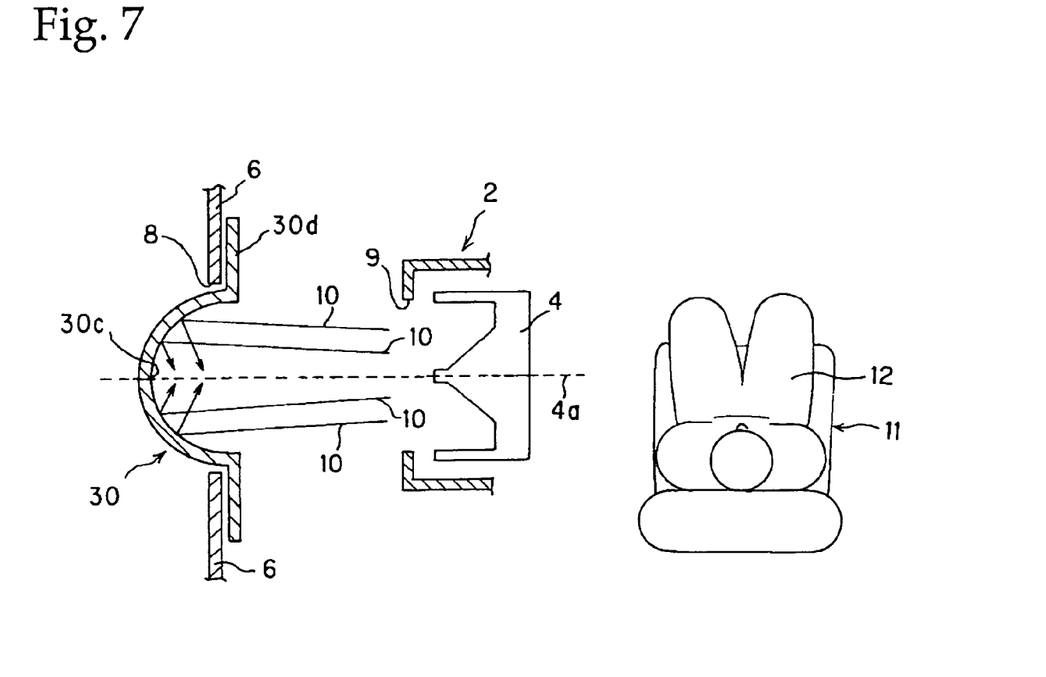
FIG. 7 is a partial sectional view of an air conditioner for a vehicle according to a third embodiment of the present invention as viewed in a horizontal direction.

FIG. 7 is a partial sectional view showing an air conditioner for a vehicle as viewed in a horizontal direction according to a third embodiment of the present invention. As shown in FIG. 7, a cover 30 is a variation of the cover 1 as the noise reducing device in the first embodiment.

The cover 30 comprises a semi cylinder, i.e., a curved surface, which is concaved in the direction of the length of the vehicle and on the outer side of the vehicle, and a flange 30d joined to the front and rear ends of the curved surface and extending in the direction of the length of the vehicle. If the cover 30 is fitted into the hole 8, a deepest part 30c which is concaved most on the outer side of the vehicle is positioned to be substantially an extension of the rotational center 4a of the fan 4.

The operating noise 10 emitted from the air intake port 9 of the rear air conditioner 2 is reflected on the surface of the cover 30, and the reflected noise interfere with each other, so that the noise emitted into the vehicle compartment can be reduced. Further, since the deepest part 30c of the cover 30 is located to be an extension of the rotational axis of the fan 4, operating noise emitted from the rear air conditioner 2 can be reduced in the most efficient manner as is the case with the above-described first and second embodiments.

In another embodiment, a cover which has an emission surface in cross-section is adopted. With this arrangement, operating noise emitted from the rear air conditioner 2 and reflected on the cover is concentrated on one focus and can be made to interfere with each other in a more efficient manner.

A description will now be given of an air conditioner for a vehicle according to the present invention, which employs a cover as a noise direction changing device.

Figure 8:
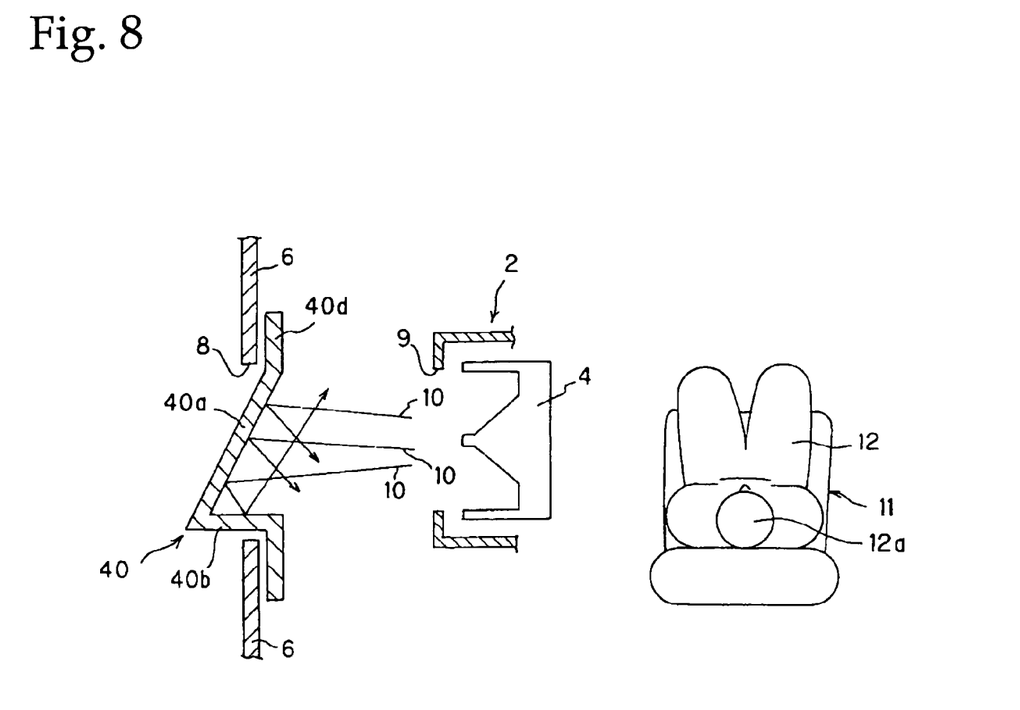
FIG. 8 is a partial sectional view of an air conditioner for a vehicle according to a fourth embodiment of the present invention as viewed in a horizontal direction.

FIG. 8 is a partial sectional view showing an air conditioner for a vehicle according to a fourth embodiment of the present invention as viewed in a horizontal direction. As shown in FIG. 8, a cover 40 as a noise direction changing device is provided at a location opposed to the air intake port 9 of the rear air conditioner 2.

The cover 40 comprises an inclined surface 40a extending toward the outer side of the vehicle as it goes rearward in the vehicle, a flat surface 40b joined to the rear end of the inclined surface 40a and extending toward the inner side of the vehicle, and a flange 40d joined to the front end of the inclined surface 40a and the rear end of the flat surface 40b and extending in the direction of the length of the vehicle.

The operating noise 10 emitted from the air intake port 9 of the rear air conditioner 2 is reflected on the inclined surface 40a in a rearward direction of the vehicle, i.e., in a direction away from the head 12a of the passenger 12 seated on the seat 11 in the vehicle compartment. Namely, even if the operating noise 10 reflected on the inclined surface 40a is reflected on the flat surface 40b, it is reflected in a direction toward an area where there is no passenger. Therefore, it is possible to prevent operating noise from the rear air conditioner 2 from reaching the passenger 2 seated on the seat 11, and to inhibit the passenger 2 from feeling uncomfortable.

Further, although in the present embodiment, the cover 40 has the above-described sectional form in the direction of the height of the vehicle, the present invention is not limited to this, but it is possible to adopt a cover which has a similar sectional form in the direction of the height of the vehicle. That is, if a cover which has an inclined surface extending toward the outer side of the vehicle as it goes downward in the vehicle, and a flat surface joined to the lower end of the inclined surface and extending toward the inner side of the vehicle, is provided at a location opposed to the air intake port 9 of the rear air conditioner 2, operating noise emitted from the rear air conditioner 2 can be reflected in a direction away from the head 12a of the passenger 12, i.e., downward in the vehicle, so that the same effects as in the present embodiment can be obtained.

Figure 9:
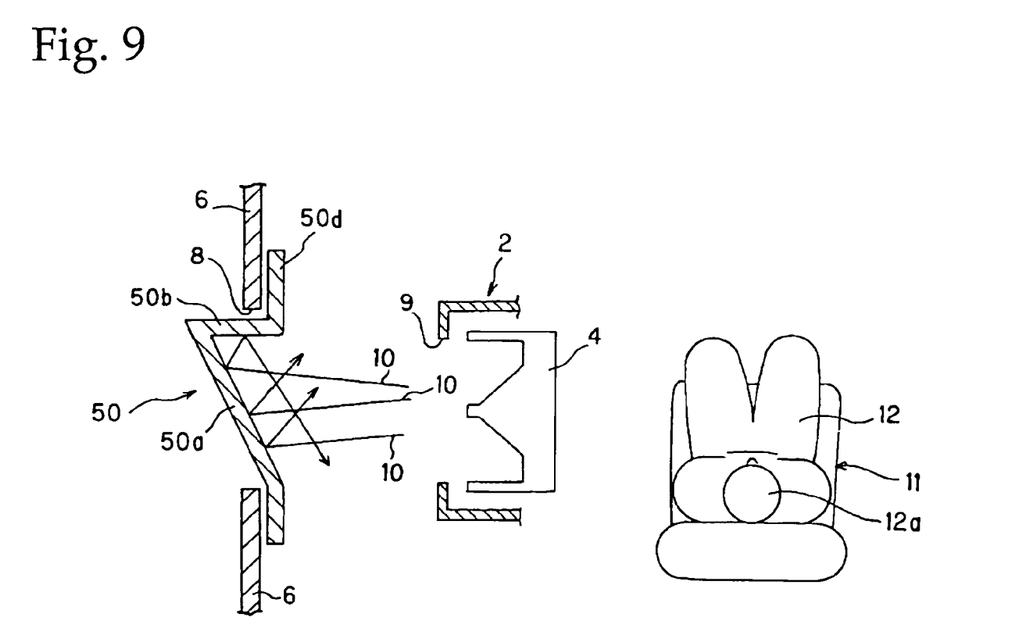
FIG. 9 is a partial sectional view of an air conditioner for a vehicle according to a fifth embodiment of the present invention as viewed in a horizontal direction.

FIG. 9 is a partial sectional view showing an air conditioner for a vehicle according to a fifth embodiment of the present invention as viewed in a horizontal direction. As shown in FIG. 9, a cover 50 is a variation of the cover 40 as the noise direction changing device in the fourth embodiment.

The cover 50 comprises an inclined surface 50a extending toward the inner side of the vehicle as it goes rearward in the vehicle, a flat surface 50b joined to front end of the inclined surface 50a and extending toward the inner side of the vehicle, and a flange 50d joined to the rear end of the inclined surface 50b and the front end of the flat surface 50b and extending in the direction of the length of the vehicle.

Therefore, as is the case with the cover 40 which is adopted in the fourth embodiment, the operating noise 10 emitted from the air intake 9 port of the rear air conditioner 2 is reflected on the inclined surface 50a in a rearward direction of the vehicle, i.e., in a direction away from the head 12a of the passenger 12 seated on the seat 11 in the vehicle compartment. Even if the operating noise 10 reflected on the inclined surface 50a is reflected on the flat surface 50b, it is reflected in a direction toward an area where there is no passenger. Therefore, it is possible to prevent operating noise from the rear air conditioner 2 from reaching the passenger 2 seated on the seat 11, and to inhibit the passenger 2 from feeling uncomfortable due to the operating noise.

Further, although in the present embodiment, the cover 50 has the above described sectional form in the direction of the length of the vehicle, the present invention is not limited to this, but it is possible to adopt a cover which has a similar sectional form in the direction of the height of the vehicle. That is, if a cover which has an inclined surface extending toward the outer side of the vehicle as it goes upward in the vehicle, and a flat surface joined to the upper end of the inclined surface and extending toward the inner side of the vehicle, is provided at a location opposed to the air intake port 9 of the rear air conditioner 2, operating noise emitted from the rear air conditioner 2 can be reflected in a direction away from the head 12a of the passenger 12, i.e., in a downward direction of the vehicle, so that the same effects as in the present embodiment can be obtained.

Figure 10:
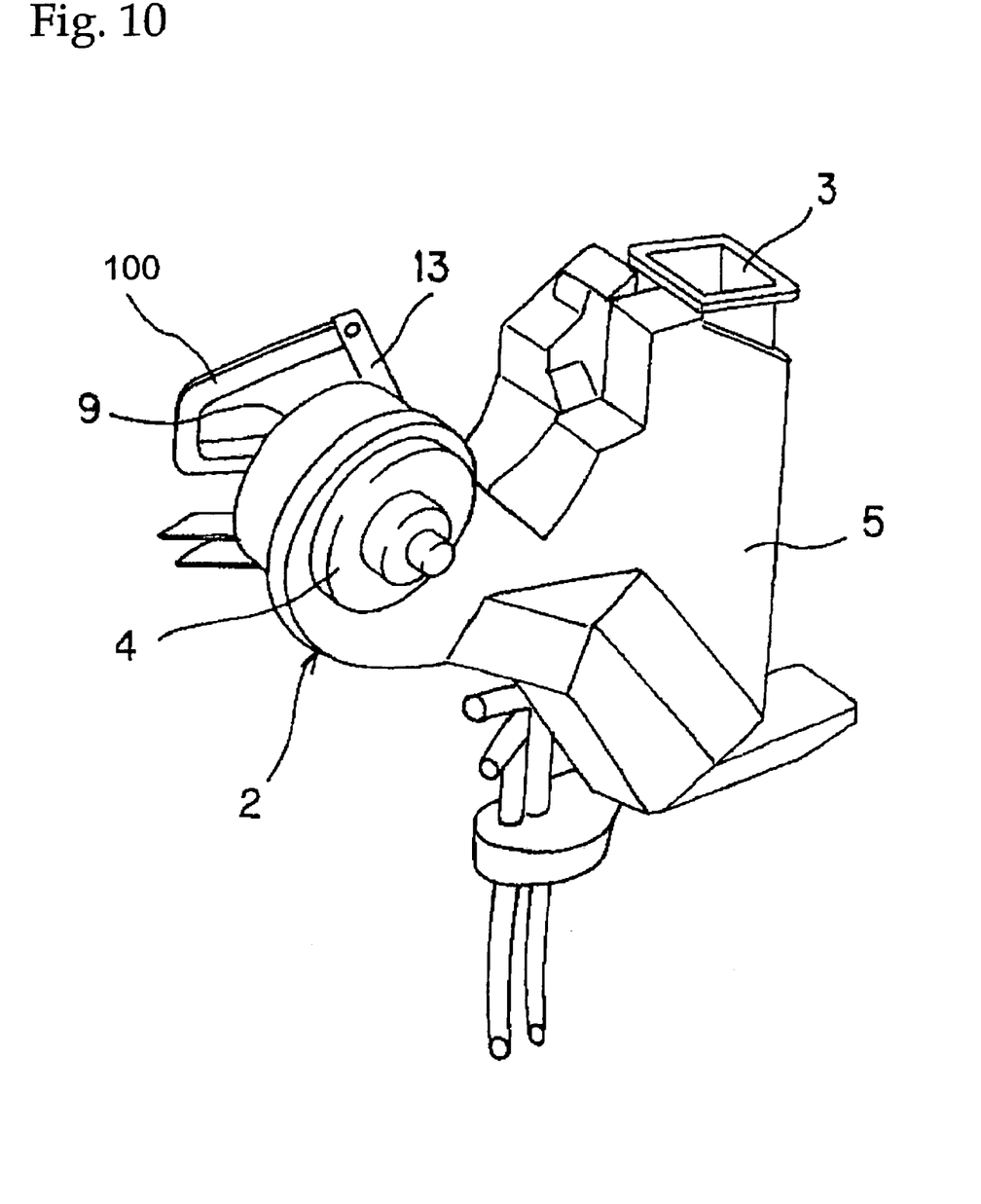
FIG. 10 is a perspective view showing an air conditioner for a vehicle according to another embodiment of the present invention.
Figure 11:
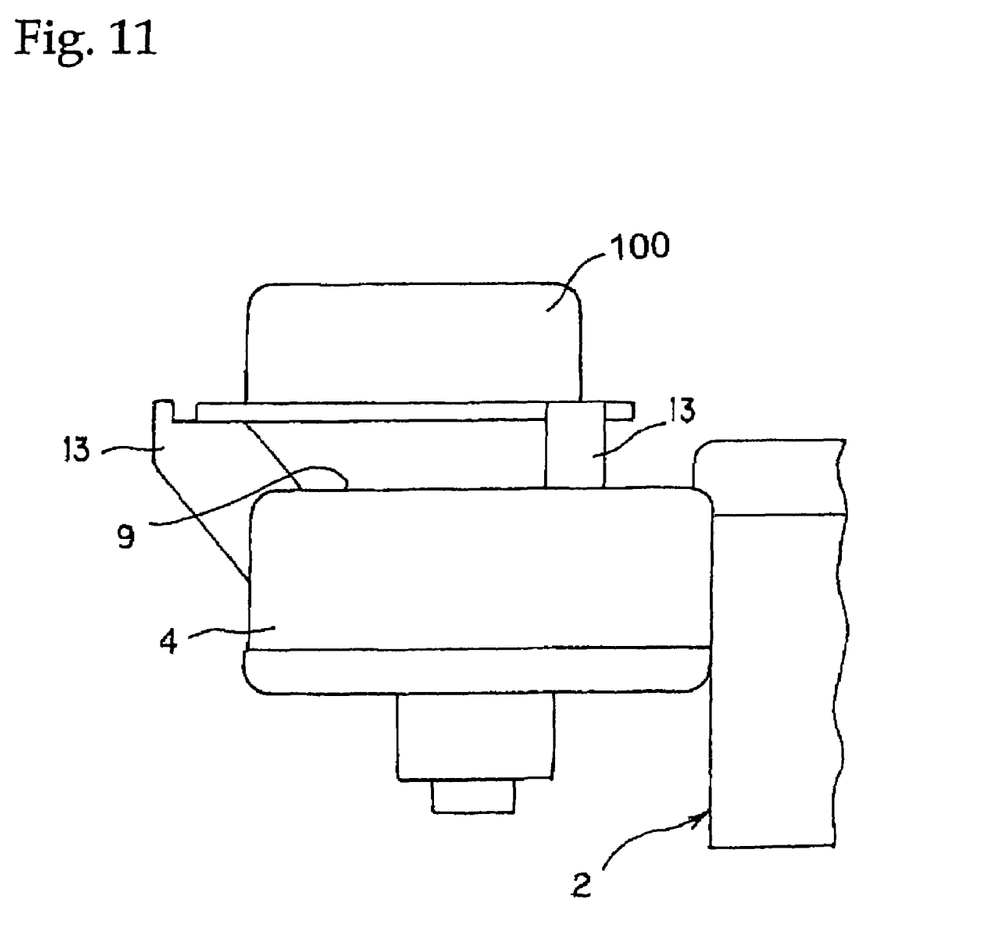
FIG. 11 is an enlarged plan view showing an air intake port of the air conditioner for the vehicle in FIG. 10.

Further, in another embodiment, a cover 100 may be directly annexed to the front of the air intake port 9 of the rear air conditioner 2 as shown in FIGS. 10 and 11. Specifically, the cover 100 is fixed to the front of the air intake 9 by a stay 13. The cover 100 is opened in front of the air intake 9, and is disposed in opposed relation to the air intake port 9.

In this embodiment, noise reflected on the cover 100 is emitted into the air intake port 9 to interfere with the operating noise 10, so that the noise can be reduced and emitted in a direction away from the head 12a of the passenger 12 seated on the seat 11 in the vehicle compartment. It should be noted that in the embodiment illustrated in FIGS. 10 and 11, the cover 1 adapted in the first embodiment is used, but in still another embodiment, it is possible to adopt a cover which has the same sectional form as that of any of the cover 20 adopted in the second embodiment, the cover 30 adopted in the third embodiment, the cover 40 adopted in the fourth embodiment, and the cover 50 adopted in the fifth embodiment. In this embodiment, operating noise can be reflected to interfere with each other to be reduced, and can be reflected in a direction away from the head 12a of the passenger 12 seated on the seat 11 in the vehicle compartment as in the above described embodiment.

In the air conditioner for the vehicle according to the present invention, a noise absorbing material may be further provided on a surface of the air intake port 9 of any of the cover 10 adopted in the first embodiment, the cover 20 adopted in the second embodiment, the cover 30 adopted in the third embodiment, the cover 40 adopted in the fourth embodiment, and the cover 50 adopted in the fifth embodiment. With this arrangement, part of the operating noise 10 emitted from the air intake 9 is absorbed by the noise absorbing member, and hence the operating noise 10 can be further inhibited from being transmitted to the vehicle compartment.

In the air conditioner for the vehicle according to the present invention, an interior material may be attached to a surface of the rear air conditioner 2 on the quarter trim 7 side. With this arrangement, the operating noise 10 emitted from the rear air conditioner 2 is absorbed by the interior material as well, and hence the operating noise 10 can be further inhibited from being transmitted to the vehicle compartment.

It goes without saying that the present invention is not limited to the embodiments described above, but various changes in or to the above described embodiments may be possible without departing from the spirits of the present invention.

The invention claimed is:

1. An air conditioner for a vehicle, comprising:
a vehicle body panel;
an air-conditioning device having a fan and provided on an inner side of a vehicle compartment and in vicinity of said vehicle body panel, and having an air intake port facing said vehicle body panel;
a noise reducing device provided at a location opposed to said air intake port, for causing noise emitted from said air intake port to interfere with each other and reducing the noise; and
an interior material mounted on a vehicle compartment inner side of said inner panel,
wherein said noise reducing device includes a concaved part concaved on an outer side of the vehicle,
said concaved part includes a cover attached to an opening formed at a location opposed to said air intake port,
said vehicle body panel includes an inner panel of the vehicle, and the opening is formed in said inner panel, and
said air-conditioning device is disposed between said inner panel and said interior material.

2. An air conditioner for a vehicle, comprising:
a vehicle body panel;
an air-conditioning device having a fan and provided on an inner side of a vehicle compartment and in vicinity of said vehicle body panel, and having an air intake port facing said vehicle body panel; and
a noise reducing device provided at a location opposed to said air intake port, for causing noise emitted from said air intake port to interfere with each other and reducing the noise,
wherein said noise reducing device includes a concaved part concaved on an outer side of the vehicle, and
wherein said concave part includes,
a first inclined surface extending toward the outer side of the vehicle as said first inclined surface goes downward in the vehicle, and
a second inclined surface formed continuously from a lower end of said first inclined surface and extending toward an inner side of the vehicle as said second inclined surface goes downward in the vehicle.

3. An air conditioner for a vehicle, comprising:
a vehicle body panel;
an air-conditioning device having a fan and provided on an inner side of a vehicle compartment and in vicinity of said vehicle body panel, and having an air intake port facing said vehicle body panel; and
a noise reducing device provided at a location opposed to said air intake port, for causing noise emitted from said air intake port to interfere with each other and reducing the noise,
wherein said noise reducing device includes a concaved part concaved on an outer side of the vehicle, and
wherein said air intake port is formed in a blower with the fan incorporated therein, and said concaved part includes a deepest part concaved most on the outer side of the vehicle compartment and opposed to a rotational center of the fan.

4. An air conditioner for a vehicle, comprising:
a vehicle body panel;
an air-conditioning device having a fan and provided on an inner side of a vehicle compartment and in vicinity of said vehicle body panel, and having an air intake port facing said vehicle body panel;
a seat provided at a location opposed to said air conditioning device and on an inner side of the vehicle compartment as compared with said air conditioning device; and
a noise direction changing device provided at a location opposed to said air intake port, for changing a direction of noise emitted from said air intake port to such a direction away from a head of a passenger seated on the seat, said noise direction changing device including a concaved part concaved on an outer side of the vehicle,
wherein said vehicle body panel includes a side panel of a vehicle body, and said noise direction changing device includes an inclined surface extending toward an outer side of the vehicle compartment as said noise direction changing device goes downward.

5. An air conditioner for a vehicle, comprising:
a vehicle body panel;
an air-conditioning device having a fan and provided on an inner side of a vehicle compartment and in vicinity of said vehicle body panel, and having an air intake port facing said vehicle body panel;
a noise reducing device provided at a location opposed to said air intake port, for reflecting noise emitted from said air intake port away from a head of a passenger in the vehicle compartment; and an interior material mounted on a vehicle compartment inner side of said inner panel, wherein said noise reducing device includes a concaved part concaved on an outer side of the vehicle, said concaved part includes a cover attached to an opening formed at a location opposed to said air intake port, said vehicle body panel includes an inner panel of the vehicle, and the opening is formed in said inner panel, and said air-conditioning device is disposed between said inner panel and said interior material.

6. An air conditioner for a vehicle, comprising:

a vehicle body panel;

an air-conditioning device having a fan and provided on an inner side of a vehicle compartment and in vicinity of said vehicle body panel, and having an air intake port facing said vehicle body panel;

a noise direction changing device provided at a location opposed to said air intake port, for reflecting noise emitted from said air intake port away from a head of a passenger in the vehicle compartment, wherein said noise direction changing device includes a concaved part concaved on an outer side of the vehicle, and wherein said concave part includes,
- a first inclined surface extending toward the outer side of the vehicle as said first inclined surface goes downward in the vehicle, and
- a second inclined surface formed continuously from a lower end of said first inclined surface and extending toward an inner side of the vehicle as said second inclined surface goes downward in the vehicle.

7. An air conditioner for a vehicle, comprising:

a vehicle body panel;

an air-conditioning device having a fan and provided on an inner side of a vehicle compartment and in vicinity of said vehicle body panel, and having an air intake port facing said vehicle body panel;

a noise direction changing device provided at a location opposed to said air intake port, for reflecting noise emitted from said air intake port away from a head of a passenger in the vehicle compartment, wherein said noise direction changing device includes a concaved part concaved on an outer side of the vehicle, and wherein said air intake port is formed in a blower with the fan incorporated therein, and said concaved part includes a deepest part concaved most on the outer side of the vehicle compartment and opposed to a rotational center of the fan.

8. An air conditioner for a vehicle, comprising:

a vehicle body panel;

an air-conditioning device provided on an inner side of a vehicle compartment and in vicinity of said vehicle body panel, and having an air intake port, accommodating a fan, facing said vehicle body panel;

a seat provided at a location opposed to said air conditioning device and on an inner side of the vehicle compartment as compared with said air conditioning device; and a noise direction changing device provided at a location opposed to said air intake port, for changing a direction of noise emitted from said air intake port to such a direction away from a head of a passenger seated on the seat, said noise direction changing device including a concaved part concaved on an outer side of the vehicle, wherein, said fan is provided at a location directly opposing said noise direction changing device, wherein said noise direction changing device includes a concaved part concaved on an outer side of the vehicle.

9. An air conditioner for a vehicle according to claim 8, wherein said concaved part includes a cover attached to an opening formed at a location opposed to said air intake port.

10. An air conditioner for a vehicle according to claim 9, further comprising:

a noise absorbing material provided on a vehicle compartment inner side surface of said concave part.

11. An air conditioner for a vehicle according to claim 8, wherein said concave part is formed as an emission surface concaved on the outer side of the vehicle.

* * * * *